Figure 5:
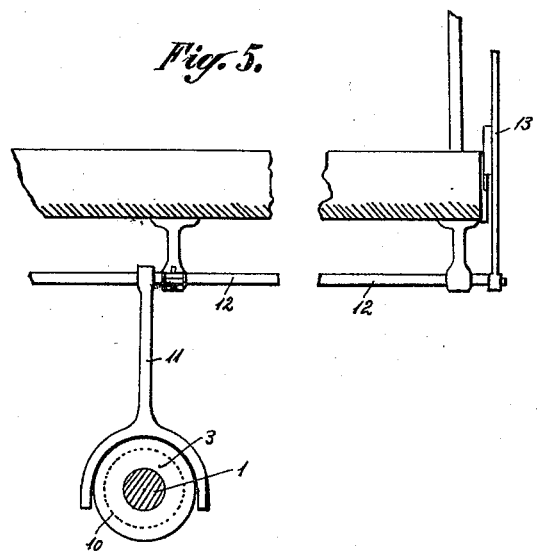

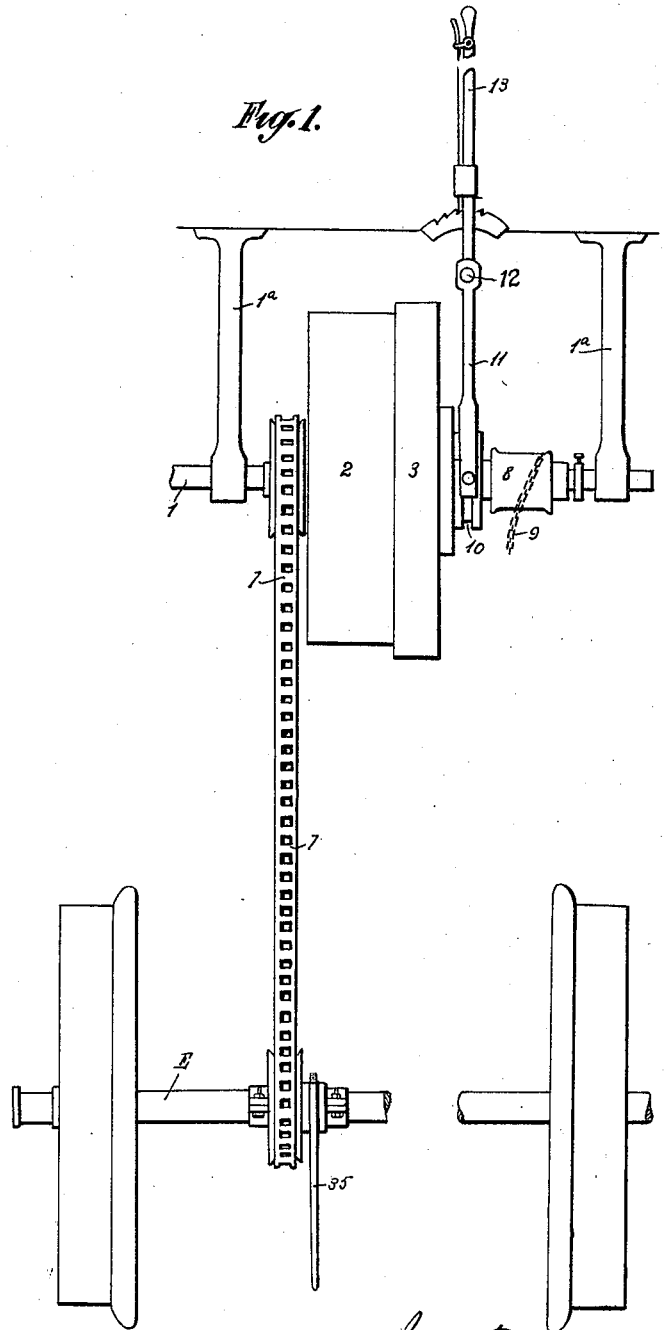

June 5, 1923.
A. E. BORGES
POWER BRAKE FOR RAILWAY CARS
Filed May 23, 1922     7 Sheets-Sheet 2
1,457,766
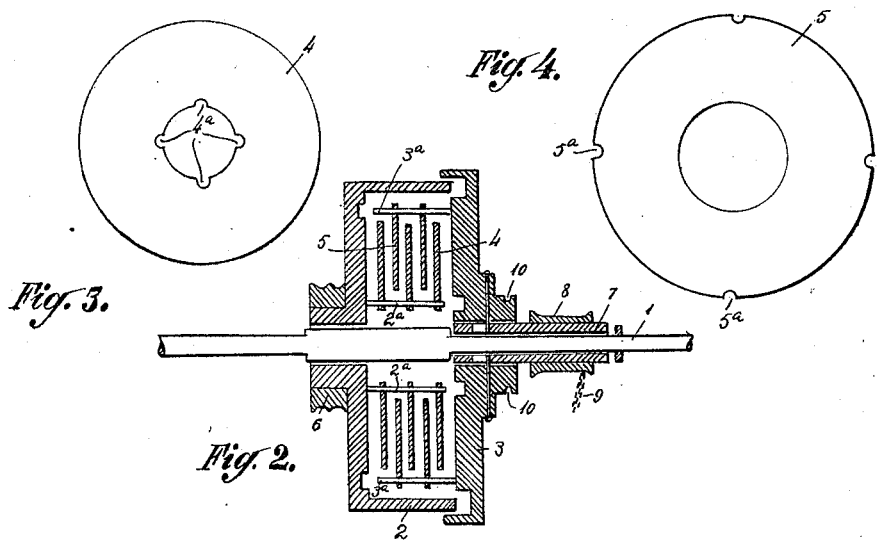
Fig. 3.   Fig. 4.
Fig. 2.
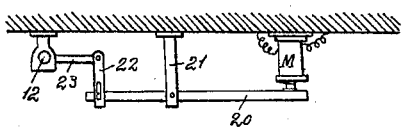
Fig. 6.
Inventor:
Alfred Euterpino Borges
By Alf———
Atty.

June 5, 1923.

A. E. BORGES 1,457,766

POWER BRAKE FOR RAILWAY CARS

Filed May 23, 1922     7 Sheets-Sheet 3

Inventor:
Alfred Euterpino Borges
By Alf———
att.

June 5, 1923.

A. E. BORGES 1,457,766

POWER BRAKE FOR RAILWAY CARS

Filed May 23, 1922

7 Sheets-Sheet 4

Inventor:
Alfred Euterpino Borges
By Alfr...
att.

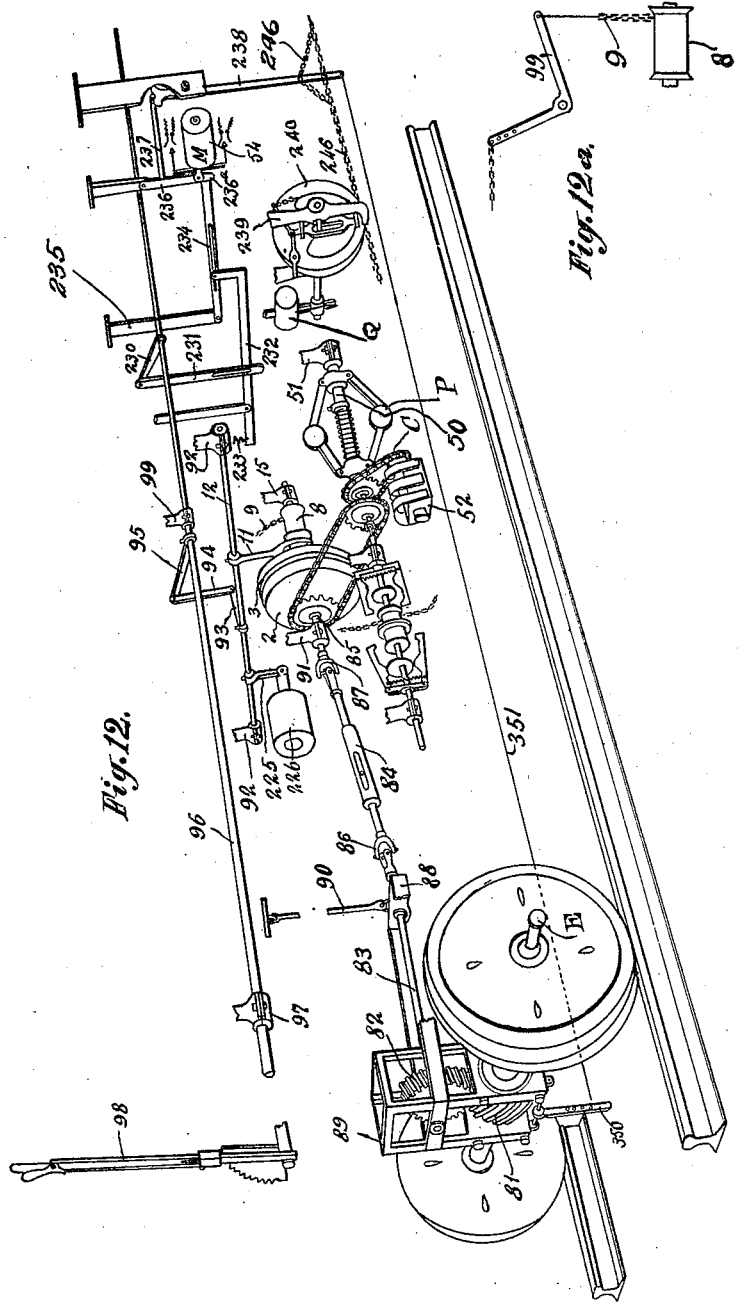

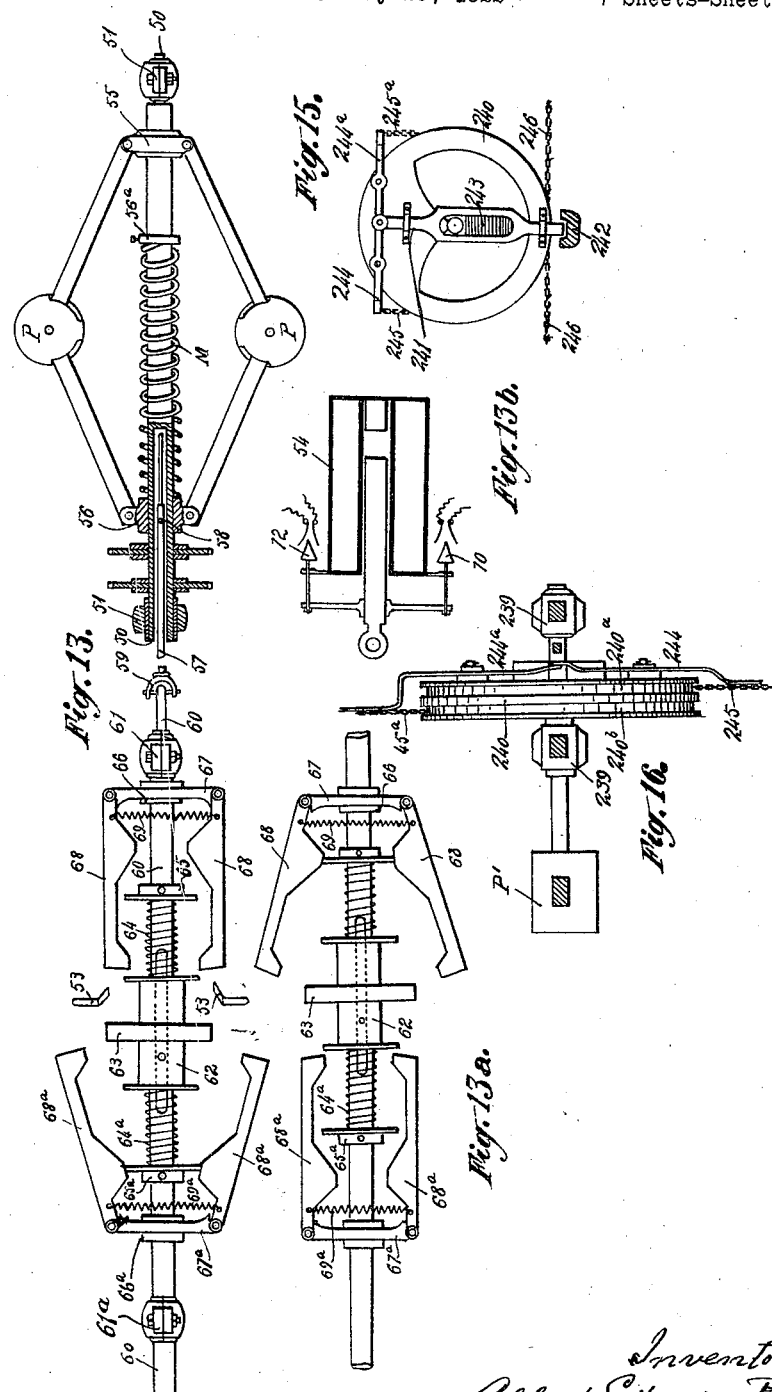

June 5, 1923.
A. E. BORGES
POWER BRAKE FOR RAILWAY CARS
Filed May 23, 1922   7 Sheets-Sheet 7
1,457,766
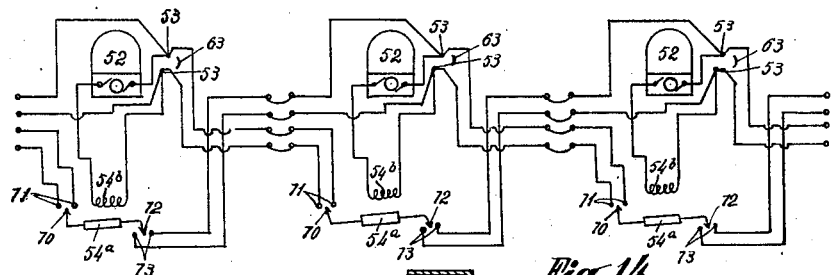
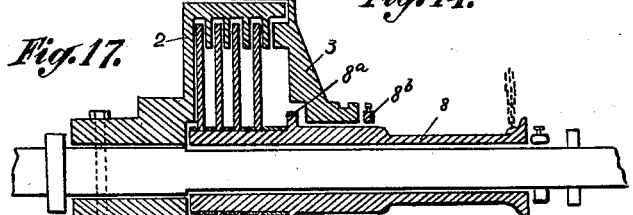
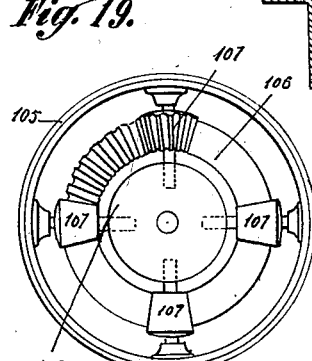
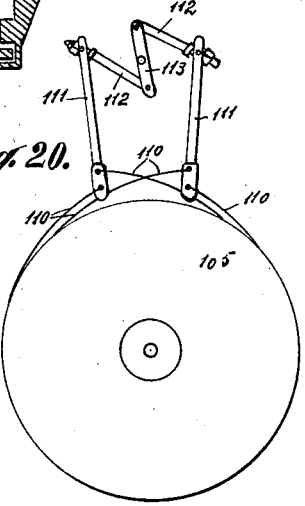
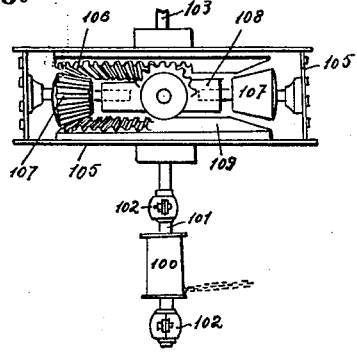
Inventor:
Alfred Enterpino Borges
By [signature]
Att.

Patented June 5, 1923.

1,457,766

UNITED STATES PATENT OFFICE.

ALFREDO EUTERPINO BORGES, OF FORTALEZA, CEARA, BRAZIL.

POWER BRAKE FOR RAILWAY CARS.

Application filed May 23, 1922. Serial No. 563,179.

*To all whom it may concern:*

Be it known that I, ALFREDO EUTERPINO BORGES, citizen of the United States of Brazil, residing at Rua Padre Mororo, No. 188, Fortaleza, and State of Ceara, Brazil, have invented certain new and useful Improvements in Power Brakes for Railway Cars, of which the following is a specification.

The invention relates to power brakes for railway cars and the like and has for its primary object to provide a brake utilizing the inertia of the moving train, thus reducing to a minimum the labor of the trainmen in operating the brakes, at the same time that these can be applied more quickly and more effectively.

Other objects of the invention are to provide for the stopping of the train: 1—by the operation of a hand lever located on each car; 2—by engineman closing an electric circuit, through the operation of a switch located at the engine cabin; 3—by any of the passengers closing a second electric circuit, through the operation of a switch provided on each car; 4—by the operation of a device on the train, which can be brought into action by a station agent, in case of danger or carelessness; 5—by the automatic operation of another device, in case one of the cars breaks the couplings and runs away.

The accompanying drawings show an embodiment of the invention and the following description is made with reference to them, like parts being designated by like reference characters.

Figure 7:
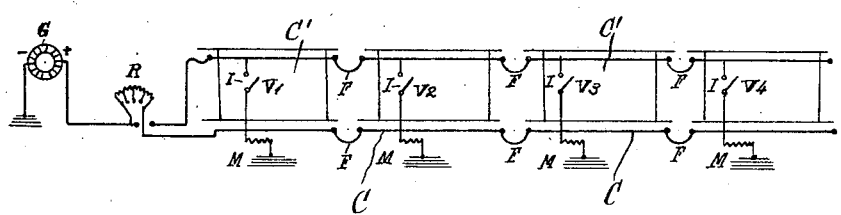
Figure 8:
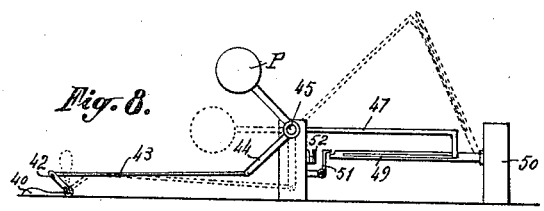
Figure 9:
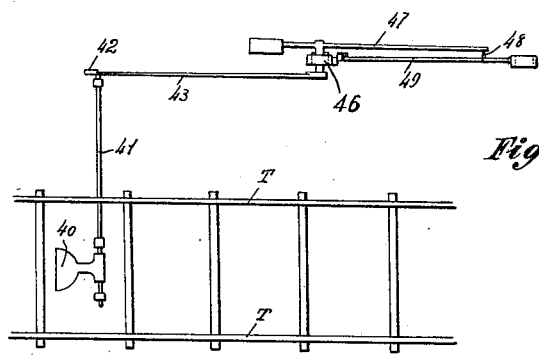
Figure 10:
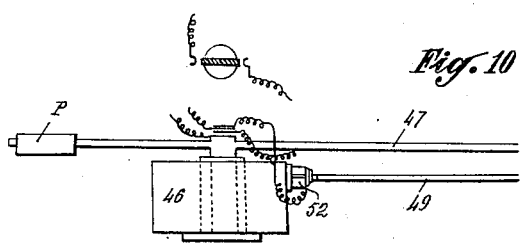
Figure 11:
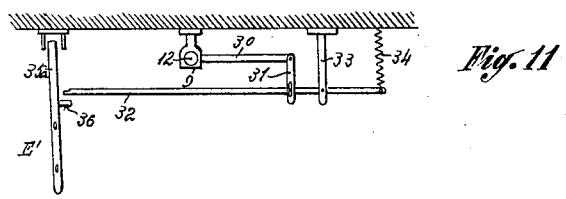

Fig. 1 shows the mechanism provided under each car to operate the chain which brings the brake-shoes into action; Fig. 2 is a longitudinal section through the axle of the clutch mechanism and connecting parts; Fig. 3 and Fig. 4 show details of the clutch mechanism; Fig. 5 shows details of the mechanism of Fig. 1.; Fig. 6 shows the electric device, located under the car floor, which acts to stop the train when operated by the engineman or any of the passengers; Fig. 7 is a diagram of the electrical connections necessary to operate the various mechanisms which bring the brakes into action; Figs. 8 and 9 are an elevation and a plan, respectively, of the device, located on the road bed, through the operation of which a train can be stopped by a station agent, at a distance; Fig. 10 shows a detail of said device; Fig. 11 shows the device, mounted on the car, which cooperates with the device shown in Figs. 8 and 9, to stop the train at a distance.

Fig. 12 is a perspective view of a modification; Fig. 12$^a$ is a detail view of some parts shown in Fig. 12. Figs. 13, 13$^a$, 13$^b$, are views of details, showing certain parts of the device illustrated in Fig. 12 in different operative positions; Fig. 14 is a circuit diagram, showing the electrical connections between various speed reducing devices; Figs. 15 and 16 are further detail views of the device shown in Fig. 12; Fig. 17 shows a modification of the clutch mechanism shown in Fig. 1; Figs. 18, 19 and 20 are various views of a modification of the power brake.

According to the form of the invention herein shown, there is provided on each railway car or the like an axle 1 (shown in Figs. 1 and 2) parallel to the axles of the car wheels and mounted on bearings supported by hangers 1$^a$ suspended from the floor of the car. On axle 1 is mounted a clutch comprising two members 2, 3. Member 2 consists of a cylindrical box mounted concentrically with axle 1, bearing on its hub a sprocket wheel 6, which cooperates with a chain 7, passing over a second sprocket wheel mounted on one of the wheel axles E. Axle 1 and box 2 thus rotate continuously while the train is moving.

Within box 2 are placed two series of friction disks 4, 5, each of the disks 4 having a central opening, (shown in Fig. 3) the periphery of which is provided with four recesses 4$^a$. To the bottom of box 2 and at right angles to it, are fixed four rods 2$^a$, placed so as to correspond to the recesses 4$^a$ of disks 4, through which they pass freely, thus making disks 4 rotate with box 2.

Each of the disks 5 of the second series is placed between two disks 4 and has a central opening, (shown in Fig. 4) larger in diameter than that of the disks 4, each disk being provided with four peripheral recesses 5$^a$, thus being capable of sliding on four other rods 3$^a$, securely fixed to the inner side of member 3, in corresponding position.

There is just enough space left between disks 4 and 5 to allow the disks 4 to rotate freely past disks 5 during the rotation of member 2, when member 3 is not in contact with member 2.

This member 3 consists of a plate mounted on a sleeve 7, on which it can slide axially, but not rotate; sleeve 7 being revolubly mounted on axle 1 and being provided with a drum 8, integral with the sleeve to which is secured one end of the chain 9, which starts the brakeshoes into operation. The hub of member 3 is provided with a circular groove 10, into which enters at two diametrically opposed points two pins secured to the arms of a bifurcated roll 11 firmly mounted on an axis 12, which can oscillate on bearings carried by hangers suspended from the car floor. To axis 12 is secured one end of hand lever 13, operable from the platform of the car, above which it projects.

The operation of the mechanism can take place in a variety of ways, corresponding to the various cases hereinbefore mentioned, as follows:

*Stopping of the train by the trainmen, by means of hand lever 13.*

As the train moves along, axle 1 and box 2 rotate continuously, driven through the mechanism hereinbefore described or through any other suitable means, disks 4 within box 2 also rotating with it. Normally, since member 3 is not in contact with box 2, there is no pressure exerted between disks 4 and disks 5, which latter are thus kept stationary. To stop the train, the trainman on each car moves the respective hand lever 13 in a direction so as to cause the bifurcated rod 11 to move member 3 axially, along the sleeve 7, towards box 2, thus forcing disks 5 into contact with disks 4. As disks 5 engage disks 4, the rotary motion of box 2 is transmitted to member 3 and sleeve 7, drum 8 winding up chain 9, which brings the brake-shoes into play. The easing off springs provided in the brake-shoes will render them inoperative, as soon as the pressure exerted on hand lever 13 ceases.

*Stopping of the train by the engineman.*

The invention also includes any adequate electrical means of throwing the brake mechanism hereinbefore described into operation. A convenient form of doing this is shown in Fig. 7, which illustrates diagrammatically the application of electrical means for bringing into action the brake mechanism, to a train of four cars $V^1$, $V^2$, $V^3$, $V^4$. The source of electric current is located on the engine, and is, preferably, a turbo generator G, from which the current flows, through a rheostat R, to a general supply main C, formed of rigid bars running along each car, flexible connections F being provided between the cars. An electro magnet M is provided under the floor of each car, connected to the supply main C. The current returns to the generator through the earth. As the engineman closes the circuit through the rheostat, magnets M are energized, each attracting its respective armature (Fig 6) and with it a lever 20, to one end of which the armature is secured and which is pivoted to a hanger 21, suspended from the car floor. Lever 20 carries at the opposite end a link 22, flexibly mounted on it, which is connected to an arm 23 firmly secured to axle 12 of the bifurcated rod 11. As lever 20 moves, it causes axle 12 to rotate and with it bifurcated rod 11, which pushes member 3 towards box 2, thus bringing the brakes to act. Link 22 is fixed to lever 20 by means of a pin sliding in a slot, so that lever 20 may not be disturbed when the brakes are applied by means of hand lever 13.

*Stopping of the train by any one of the passengers in case of danger.*

A second supply main $C^1$, similar to the first main C, is provided with switches I, one to each car. This supply main $C^1$ forms an extension of the conductor leading from the generator G to the rheostat R. It is easily seen that, if a passenger closes one of the switches I, the brakes will be applied and the train will come to a stop.

*Stopping of the train at a distance.*

On axle 12 of bifurcated rod 11 (Fig. 11) is mounted an arm 30, connected by means of a link 31 to the longer arm of lever 32 pivoted to a hanger 33 suspended from the car floor. The shorter arm of lever 32 is drawn upwards by a spring 34. Mounted on an axle secured to the lower side of the car floor, transversely of it, (Figs. 1 and 11) so that it can oscillate, is an arm $35^a$, which normally is kept vertical by its own weight. On this arm is provided a stop 36 on which normally rests the end of the longer arm of lever 32, which is also positioned transversely of the car floor. To place the end of the longer arm of lever 32 on the stop 36, the arm $35^a$ is moved to one side, the longer arm of lever 32 is raised, arm $35^a$ is allowed to come back to the vertical or normal position and the end of lever 32 is then lower onto stop 36, which keeps lever 32 horizontal against the action of spring 34.

The connection between link 31 and lever 32 consists of a pin running in a slot, so that lever 32 may not be disturbed when the brakes are applied through hand lever 13.

Arm $35^a$ is made long enough to strike against obstacles 40 provided on the road bed (Figs. 1, 8 and 9). Each obstacle 40 consists of an arm secured to an oscillating horizontal axle 41, placed at right angles to the rail T, on supports conveniently located on the road bed. On axle 41 is mounted an arm 42, connected by a link 43 to another arm 44 secured to the end of an oscillating axle 45 mounted on a support 46 on the road bed. At the opposite end of axle 45 is secured a lever 47, the shorter arm of which bears a counterweight P, the longer arm having its end curved downwards and provided with a pin 48, which enters a slot running through the whole length of an oscillating arm 49, parallel to lever 47 and mounted on a chair 50 on the road bed. On a bracket provided on support 46 is mounted an oscillating arm 51, the end of which bears a tooth which, in one of the positions of the arm, engages the end of the slotted arm 49, which is thus kept in a horizontal position and, through the connecting pin and slot, forces the counterweight lever 47 to remain horizontal, the arm 45 being then kept at such an angle that, through arm 44 and link 43, it keeps obstacle 40 in inoperative position. In this position of the various parts, counterweight P is at its highest point. To arm 51 is connected the armature of an electromagnet 52, the circuit of which may be opened or closed at a distant station. When magnet 52 is deenergized, arm 51 holds firmly arm 49. Whenever the station agent, in an emergency, wishes to stop a train or a run-away car or cars, he closes the circuit of magnet 52, which attracts its armature and with it arm 51, whereupon the tooth at the end of arm 51 is disengaged from arm 49 and the counterweight P descends, thus forcing obstacle 40 to assume a vertical position. When the train arrives opposite obstacle 40, arms 35ª on the cars collide with it and are moved aside, releasing lever 32, whereupon spring 34 acts through connections 32, 31, 30, to oscillate axle 12 of bifurcated rod 11, which will, then, move member 3 of the clutch mechanism toward member 2, thus causing the brakes to be applied.

*Stopping of the train when a coupling is broken or loosened.*

The train is provided with means (a cord, for example) to join the various arms 35ª to each other in such manner that, when the arm 35ª of the first car collides with obstacle 40 placed on the road bed, all the other arms 35ª of the various cars are moved simultaneously and the brakes of all the cars come into operation. In case a coupling breaks or is loosened, the cord or any like means is subjected to tension before it snaps and will, likewise, act on the arms 35ª of the two parts of the train, causing the brakes to be applied.

Fig. 12 is a perspective view of a modified form of the invention, in which the transmission of the rotary movement of the car wheel axles to the power brake, instead of being made through a chain and sprocket wheels, is made through a gear 81 having helicoidal teeth, mounted on the car wheel axles and meshing with a similar gear 82 mounted on the axle of the power brake mechanism. This axle is positioned longitudinally of the car and is made up of three separate parts, 83, 84, 85, the central portion 84 being connected to the end portions 83, 85 by means of universal couplings 86, 87, respectively. The central portion 84 is capable of extension and contraction, consisting of a tubular portion in which slides a round bar, which is connected to the tubular portion by means of a pin and slot, that both may rotate together. At the free end of portion 83 of the axle of the mechanism is secured gear 82. Mounted on portion 85 of the axle is the clutch mechanism, of which member 2 is secured to portion 85 to rotate with it, member 3 sliding on said portion and being made integral with a drum 8, to which is secured one end of chain 9. Portion 83 of the axle is revolubly supported in a rectangular frame 88, of which the rear end is rigidly secured to a box 89, within which are located the gears 81 and 82 mounted so as to be capable of oscillating on the car wheel axle E. The rear end of frame 88 is supported from the floor of the car by means of a link 90, which allows both the frame 88 and box 89 to oscillate about axle E in a vertical plane. Portion 85 of the power brake axle can rotate on bearings resting on hangers 91 suspended from the floor of the car.

Member 3 of the clutch mechanism, which is slidable on portion 85 of the power brake axle, is moved towards rotary member 2 by means of a bifurcated rod 11, in a manner similar to that described with reference to Fig. 1. Rod 11 is secured to an oscillating axle 12, located transversally of the car and resting on hangers 92 suspended from the car floor. To axle 12 is secured an arm 93, connected by a link 94 to an arm 95 secured to an oscillating axle 96 placed longitudinally of the car and mounted on hangers 97 suspended from the car floor. At one end of axle 96 is secured a hand lever 98 for use by the trainmen in applying the brakes. When this lever is moved, it acts, through the various parts hereinbefore mentioned, to bring the slidable member 3 of the clutch mechanism into contact with the rotary member 2, causing drum 8 to wind up chain 9, which, through a crank lever 99, (Fig. 12ª) will pull the chain acting on the brake levers of the car.

It is clearly seen that the universal couplings 86, 87, which connect the central portion 84 of axle 83, 84, 85 to the end portions 83, 85, and the sliding connection between the two members of said central portion 84, provide axle 83, 84, 85 with the necessary flexibility in all directions to absorb any shocks, due to uneven running of the cars, which might damage gears 81 and 82 and the clutch mechanism. Gears 81 and 82 are not liable to get out of mesh, as it might happen to the chain and sprocket arrangement of Fig. 1.

To axle 12, on which is mounted the bifurcated rod 11, which operates the clutch mechanism, may be connected to an arm 225 to which is secured the armature of an electro-magnet 226, supported in any convenient manner, so that when magnet 226 is energized, its armature displaces arm 225, which causes axle 12 and rod 11 to oscillate in the direction of starting the clutch mechanism to operate the brakes on the car wheels. It is easily seen that, if each car of a train is provided with an arm 225 and an electro-magnet 226, all the car wheel brakes may be operated by the electric current generated at the engine.

Fig. 12 also shows a modified form of the device which, on a train provided with power brakes according to this invention, causes the brakes to be applied automatically, in case a car coupling breaks or gets loose. The device operates as follows: On axle 96, to which is secured hand lever 98, is fixed an arm 230, connected by means of a vertical link 231 to a horizontal lever 232. The connection between link 231 and lever 232 is made through a pin (not shown) which enters a slot in the link. Lever 232 is capable of oscillating in a vertical plane and rests on a hanger suspended from the car floor; its fulcrum being located between its connection with arm 231 and the other end of said lever, which is pulled upwards by a spring 233 connected with it and secured to a fixed support. The opposite end of lever 232 bears a pin which enters a longitudinal slot provided in a horizontal lever 234, pivoted at the other end to a fixed support 235. An oscillating arm 236 hangs from a fixed support, being provided at its free end with a stop 236$^a$, on which the free end of lever 234 can be made to rest, after having been raised against the action of spring 233. In this position of the various parts 230 to 236, the brakes may be operated through hand lever 98 or electro-magnet 226, without disturbing said parts, by virtue of the pin and slot connections provided.

When arm 236 is moved to release lever 234, spring 233 will pull up the end of lever 232 to which it is connected, the opposite end of lever 232, through link 231 and arm 230, descending, thus causing axle 96 to oscillate the same as if it were acted upon through hand lever 98, causing the brakes to be applied. On the side of arm 236 opposite to that bearing stop 236$^a$ is rigidly connected an arm 237, which normally rests on the vertex of a V shaped recess on the upper end of a lever 238 pivoted, near this end and so as to oscillate in a vertical plane, to a hanger suspended from the car floor. By virtue of its own weight, lever 238 is normally kept vertical. Mounted on hangers 239 suspended from the car floor is the horizontal axle, shown in Fig. 12, of a revolving drum 240. This drum and the various parts associated with it are shown in plane of it. Mounted on one of the faces of the drum, so that it can slide in the direction of its diameter, is a latch 241 (Fig. 15) through an opening of which passes freely the axle of the drum. Normally latch 241 is kept vertical, having its lower end lodged in a recess provided on projection 242 of the lower end of one of supports 239.

A helical spring 243 provided in the opening of latch 241 has one of its ends resting on the lower face of said opening and the other end secured to the face of the drum 240, thus tending to keep latch 241 in its lowermost position, with its lower end lodged in the recess of projection 242. On one side of the upper end of latch 241 is pivoted to the face of drum 240 a lever 244, having one end pivotally connected to the upper end of latch 241. The other end of lever 244 is secured to the end of a chain or steel cable 245, which hangs from it, entering an aperture 240$^a$ provided on drum 240, coming out of this aperture at the lower side of the drum and having its lower end secured to the end of a chain or steel cable 246 which connects all the levers 238 of the various cars and is made up in sections connected to each other by friction couplings. At the side of latch 241 opposite to that to which is pivoted lever 244, is pivoted to the face of drum 240 a lever 244$^a$ similar to lever 244, having one of its ends also pivotally connected to latch 241 and the other end secured to the end of a chain or cable 245$^a$, which passing through another aperture 240$^b$ of drum 240, has the other end secured to cable 246. As long as latch 241 is held in the above mentioned manner by support 239, levers 244, 244$^a$ remain horizontal. In case the couplings of any car break or get loose, cable 246 is subjected to tension, being severed at the friction coupling located at the place where the car couplings broke. Before it breaks, however, cable 246 will have pulled the lower arm of levers 238 of both cars adjacent the broken coupling, causing the levers to oscillate which, through one of the sides of the V shaped recess at the upper ends of the lever cause arm 237 to oscillate likewise and, with it, arm 236 in the direction in which tooth 236$^a$ releases lever 234, which brings the brakes of both cars to act in the manner hereinbefore described. Also, before it breaks, cable 246, by virtue of the tension to which it is subjected when the coupling breaks, will have pulled chain 245$^a$ connected to lever 244$^a$ of drum 240 of the other car, levers 244 and 244$^a$ acting to raise latch 241 of each drum out of the recess on projection 242 against the action of spring 243. By virtue of the tension in chain 245 (or 245$^a$) drum 240 will rotate through a small angle, enough, however, to make a counterweight Q, which is secured to an arm which normally is kept vertical above the drum secured to its axle, lose its equilibrium, thus forcing the drum to continue its rotation. Drum 240 will, then, through lever 244ᵃ (or 244) and chain 245ᵃ (or 245) pull cable 246, which will in turn pull lever 238 of the second car, next the car the coupling of which was broken, in each of the two portions into which the train was divided. In like manner, cable 246 will pull chain 245 (or 245ᵃ) of drum 240 of the second next car in each portion of the train, causing the brakes to act; and chain 245ᵃ (or 245) of drum 240 of each of these cars will pull cable 246 to act in the same manner on the aforementioned parts of the third car in each portion of the train and so on in succession to the last car in each of the two separate portions of the train.

Cable 246 is secured to each of the levers 238 on the various cars of the train by means of the central portion of a cable 246ᵃ secured to cable 246 on opposite sides of lever 238.

The present invention also includes a device by means of which the speed of a railway car or the like, provided with power brakes according to this invention can be kept below a predetermined value, said device acting automatically, whenever the speed tends to become higher than the predetermined maximum speed, to reduce it to the maximum speed allowed or to a lower one or even acting to stop the car if it is not coupled to an engine.

This speed reducing device is shown in Fig. 12. Figs. 13 and 13ᵃ show certain parts of the device in different working positions. In the form herein shown, the device includes the following parts: Revolubly mounted on hangers 51 suspended from the car floor is an axle 50, held against any longitudinal displacement. Axle 50 is driven continuously from one of the car wheel axles, through the axle of the power brake mechanism according to this invention, by any suitable means. In the embodiment shown axle 50 is driven by axle 85 of the clutch mechanism through a short chain $c$ cooperating with sprocket wheels mounted on the aforesaid axles. A current generator 52, provided with a permanent magnetic field rotates continuously, driven by the car wheel axle or by axle 85 or by axle 50 through any suitable means as by a chain. Generator 52 is driven by axle 50 through a chain $c$ cooperating with sprocket wheels mounted on the generator shaft and on axle 50. One of the terminals of generator 52 is connected to one of a pair of stationary contacts 53, 53, positioned as hereinafter described. The other terminal of generator 52 is connected to one of the terminals of an electro-magnet 54, the other terminal of which is connected to the stationary contact 53. On axle 50 may be mounted a governor of any suitable type, driven by the centrifugal force generated by the rotation of said axle and which, whenever the speed of the car tends to go above a predetermined value, acts, through a suitable device adapted to open or close the generator circuit at the stationary contacts, to close said circuit causing electro-magnet 54 to attract its armature and with it oscillating arm 236, which will free lever 234, whereupon the brakes on the car wheels will be applied in a manner similar to that described for their operation at a distance or in case a coupling is broken or loosened. Said circuit opening and closing device will, preferably, be of the instantaneous action type, to eliminate sparking on opening or closing the circuit. As shown, the governor consists of a parallelogram comprising two links pivoted at one end to diametrically opposite points of a collar 55 secured to axle 50 and two other links pivoted in similar manner to collar 56, sliding on axle 50 and which runs in a slot provided in the tubular portion of axle 50 and is secured to an axle 57, slidable in said tubular portion. The other end of two of said links is pivoted to a counterweight P and that of the remaining two to another counterweight P. When, by the increase in the centrifugal force generated by axle 50 due to increased speed of the car, the counterweights P—P are drawn outward slidable collar 56 moves toward collar 55, tensioning a spring M mounted on axle 50. This spring M bears at one end on slidable collar 56 and at the other end on a collar 56ᵃ secured by a set screw to axle 50. The position of collar 56ᵃ on axle 50 determines the amount of compression of the spring and this compression in turn determines the increase in centrifugal force which is necessary to draw out the counterweights P, to close the circuit by means of which the speed of the car or train is controlled collar 56ᵃ thus providing the means to predetermine the maximum speed at which the train or car may travel. Collar 56, as it moves toward collar 55, due to the increase in the centrifugal force, pulls axle 57, which in turn pulls an axle 60 secured to axle 57 by means of a universal coupling 59, axle 60 being in alinement with axle 50 and mounted revolubly and slidably on hangers 61, 61ᵃ suspended from the car floor. A sleeve 62 mounted on axle 60 and adapted to slide on it is held from rotation on said axle by means of a pin and slot connection. On its central part sleeve 62 is provided with an insulated contact disk 63 adapted to cooperate with stationary contacts 53. A spring 64 is provided on axle 60, one end of said spring bearing against one end sleeve 62 and the other end against a collar 65 secured to axle 60. Another spring 64ᵃ also provided on axle 60 bears at one end against the opposite end of sleeve 62 and at the other end against a fixed collar 65$^a$. Hanger 61 is rigidly connected to a collar 66 provided with two arms 67, diametrically opposed to each other, each having pivoted to its outer end another arm 68. Arms 68 are drawn towards each other, till they are more or less parallel to axle 60, by a spring 69 connecting both arms. Hanger 61$^a$ is connected in a similar manner to a collar 66$^a$, similar to collar 66 and provided with a flexible system consisting of arms 67$^a$—68$^a$—68$^a$ cooperating with a spring 69$^a$, similar in all respects to the aforementioned system, comprising arms 67, 68—68 and spring 69. Axle 60 slides freely on collars 66, 66$^a$. Each of the systems comprising arms 67, 68—68 or arms 67$^a$ 68$^a$—68$^a$ is U-shaped, having the opening of the U facing sleeve 62. Sleeve 62, springs 64, 64$^a$ and the flexible systems comprising arms 67, 68—68 and arms 67$^a$, 68$^a$—68$^a$ provide the means to open or close rapidly the circuit of generator 52 through stationary contacts 53, 53 as follows:

Be it supposed, in the first place, that the traveling speed of the car is below the maximum allowed. Axle 60 (Fig. 13) will then be kept, by means of the speed controlling governor, in such a position on hangers 61, 61$^a$ that the contacting disk 63 is out of contact with stationary contacts 53, 53, which are located between said disk and the free ends of arms 68—68, which are, then, more or less parallel to each other. Arms 68$^a$—68$^a$, however, have been drawn outward by the action of a disk provided on collar 65$^a$, which, as axle 60 was moved to its present position, caused said arms to open out by engaging tapering surfaces provided on the latter. Springs 64, 64$^a$ on the sides of the sleeve 62 are, then, free from compression. Now, if the speed increases to the predetermined maximum speed, counterweights P—P will recede from axle 50 and slidable collar 56 will move toward fixed collar 55, pulling axle 60 to the right (Fig. 13) the right end of sleeve 62 colliding with the ends of arms 68. As axle 60 keeps on moving to the right on sleeve 62, it will press spring 64$^a$ by means of collar 65$^a$ and, as axle 50 moves likewise, a disk provided on collar 65 will engage the tapering surfaces of arms 68—68, forcing the latter to open out, insulated disk 63 engaging contacts 53, 53, thus closing the circuit of generator 52.

In a train made up of cars provided with power brakes according to the present invention and with the speed reducing device above described, it is advisable to have all these latter devices electrically connected also to each other, so as to insure their simultaneous action, in case any one of movable contacts 63 fails to engage stationary contacts 53, 53, which is liable to happen, since it is rather difficult to adjust all contacts for simultaneous operation.

Fig. 14 shows diagrammatically the electrical connections between a plurality of speed reducing devices mounted on the cars of a train, for the above mentioned purpose. The armature 54$^a$ of the electro-magnet 54, mentioned above, of each car is provided with a contact 70 (see also Fig. 13$^b$) adapted to engage a pair of stationary contacts 71—71, when said armature is attracted through winding 54$^b$ of said electro-magnet being energized. Contacts 71—71 are connected by conductor wires, respectively, to contacts 53—53, already mentioned, of the next car in one direction. Armature 54$^a$ is provided with a second contact 72, which will engage a pair of stationary contacts 73—73 at the same time that contact 70 engages contacts 71—71. Contacts 73—73 are connected by conductor wires, respectively, to the stationary contacts 53—53 of the car next to the first mentioned car in the opposite direction. Thus, by means of these electrical connections, it is obvious that, if the speed reducing device of one of the cars acts to close the circuit of generator 52 for that car, before the speed reducing devices of the other cars act to close the respective circuits of generators 52, electro-magnets 54 of all the cars will be energized by the current of generator 52 for said car and, in consequence, the power brakes of all the cars will be applied simultaneously.

In the case of the device shown in Fig. 12, the stopping of the train at a distance by a station agent will take place in a manner similar to that described with reference to Figs. 1 to 12. On each car is provided a lever 350, mounted so as to oscillate in a vertical plane longitudinally of the car and connected by a rigid rod 351 to lever 238. Lever 350 is adapted to collide with obstacles 40 (already described) when these have been moved to upright position.

Fig. 17 shows a modified form of connection between drum 8 and pressure plate 3 of the clutch mechanism of the power brake according to the present invention. In this modified form, the pressure plate is revolubly mounted on a sleeve on which is formed drum 8, being adapted to slide longitudinally on the sleeve between an abutment 8$^a$ integral with the sleeve and a collar 8$^b$ secured to the sleeve. Said sleeve is, in turn, adapted to slide along the portion reduced in diameter of the axle of the clutch mechanism, between the end of the portion larger in diameter and another fixed collar. When, through the operation of the bifurcated rod hereinbefore mentioned, plate 3 is moved towards disk box 2, it butts against abutment 8$^a$ of said sleeve and pushes and presses the sleeve against the end of the portion larger in diameter of the axle of the clutch mechanism, thus making the sleeve revolve with the axle. In this modified form, when the brakes act, the pressure plate is not subject to the strain to which the chain operating the brakes gives rise and so, the brakes can be eased off readily. In the case of the device shown in Fig. 2, it would be necessary to exert a greater effort to ease off the brakes, since the strains created by said chains are transmitted to the pressure plate through the connection by means of which this plate is mounted so that it can slide axially on the drum carrying the chain.

The clutch mechanism of Figs. 2 and 17 are of the Weston type, in which the friction disks, when not under pressure, rotate freely without friction, although contacting with each other. In the figures they have been shown spaced apart for sake of clearness.

In Figs. 18, 19 and 20 is shown a modified form of the power brake according to the present invention, in which the clutch mechanism comprises differential gearing, through which the rotation of an axle driven by one of the car wheel axles is communicated to the drum which winds up the brake operating chain, when a friction strap, adapted to the differential box, is made to grip said box.

In this modified form, the drum 100 for the brake operating chain is mounted on an axle 101 disposed longitudinally of the car and revolving on bearings provided in hangers 102, 102 suspended from the floor of the car. One end of axle 101 lies adjacent the end of another axle 103 alined with axle 101 and revolving on hangers suspended from the floor of the car. Axle 103 is driven by one of the car wheel axles through any convenient means, as for example, through connections similar to those which, in the device shown in Fig. 12, serve to drive axle 85 of the clutch mechanism of the Weston type from car wheel axle E. Concentrically mounted on axles 101 and 103, revolves freely on them a cylindrical box 105, containing lubricating oil. Within this box is firmly mounted on axle 103 a conical gear wheel 106, which meshes with four conical pinions 107 revolving on axles arranged radially in box 105 and each of which has one end secured to the cylindrical wall of box 105, the opposite end being secured to a wheel 108 which revolves freely on axles 101 and 103. Pinions 107 are also in mesh with a conical gear wheel 109 secured to axle 101 of drum 100. A double friction strap 110 is arranged on cylindrical box 105 and is operated through two levers 111 which are connected by means of links 112 to the free end of an arm 113 secured to an axle 114 arranged longitudinally of the car and mounted to oscillate on hangers suspended from the floor of the car, axle 114 being operated through the hand lever operated by the trainmen.

As long as strap 110 is not pressed around box 105, the conical gear wheel 106, by means of the pinions 107, drives box 105, pinions 107 gyrating around conical gear wheel 109 without communicating to it any rotary movement. As the trainman, however, operate the hand lever, to press gradually strap 110 around box 105, the rotary movement of the latter will be gradually retarded and pinions 107 will communicate to conical gear wheel 109 and through it to drum 100 of the brake chain a rotary movement which will gradually increase in speed till it equals that of conical gear wheel 106, thus bringing the power brakes of the car to act.

As the trainman moves the hand lever to ease off strap 110 on box 105, the brakes on the car wheels will react and receding from the wheels will cause box 105 to rotate and with it drum 100 in the direction to unwind the brake chain.

I claim as my invention:

1. In power brakes for railway cars, the combination with the car body, the car wheels, and the brake-shoes therefor, of a clutch-member adapted to continuously rotate during the running of the car, a stationary second clutch-member normally disengaged from the said first clutch-member, a rocking shaft a lever on said shaft for causing the engagement of the said two clutch-members upon the rocking of said shaft, a source of electricity, an electric circuit, means for opening and closing said circuit, an electro-magnet in said circuit, a second lever and a connecting means between the said electro-magnet and the said lever for rocking the said shaft upon the said magnet being energized.

2. In power brakes for railway cars, the combination with the car body, the car wheels and the brake-shoes therefor, of a rotary clutch-member, a stationary second clutch member normally disengaged from the said first clutch-member, an oscillating axle, a link connecting said axle to the said second clutch-member for causing its engagement with the said first clutch-member, a three part flexible axle carrying the said rotary clutch-member, a gear wheel at the other end of said axle, a second gear wheel mounted on the car wheel axle in mesh with the said other gear wheel, an oscillating frame supporting a section of the said three-part axle, and means for operating the said oscillating axle.

3. The combination as set forth in claim 2, in which the means for operating the said oscillating axle comprises an electro-magnet, a link connecting its armature to the said axle, an electric circuit, a source of electricity included in said circuit, and a means for closing and opening said circuit from a distance.

4. In power brakes for railway cars, the combination with the car body, the car wheels, and a brake-mechanism, of means for operating said brake-mechanism, a current generator operated by one of the car wheel axles, an electric circuit, an electro-magnet included in said circuit, controlling the said brake-mechanism operating means, stationary contacts in said circuit, a movable contact adapted to co-operate with the said stationary contacts to open and close the said electric circuit, a rotatable axle adapted to be rotated by one of the car wheels, a centrifugal governor mounted on said rotatable axle and a connecting means between the said governor and the said movable contact, the arrangement being such that on the speed of the car wheels exceeding a predetermined rate the said movable contact automatically closes the said electric circuit, thereby causing the operation of the said brake-mechanism.

5. The combination as set forth in claim 4, including also a means comprising a compressible spring and an adjustable stop therefor for predetermining the maximum rate of speed of the car wheels.

6. The combination as set forth in claim 4, applied to a train of cars, including two sets of contacts on each car, an electric circuit, the armature of the electro-magnet on each car being provided with two contacts adapted to cooperate with the said two sets of contacts so as to close the electric circuit for all the cars.

7. In power brakes for railway cars, the combination with the car body, the car wheels and a brake-mechanism therefor, of a means for automatically operating the said brake-mechanism, comprising a driving axle rotating with one of the car wheels, a driven axle in alinement with the said driving axle, connecting means between the said driven axle and the said brake-mechanism, bearings for said two axles, a closed cylindrical casing mounted on the inner ends of said axles so as to freely revolve thereon, gear wheels mounted on said axles within said casing, pinions rotatably mounted on said casing in mesh with said gear wheels, a friction strap surrounding the said casing, and means for automatically tightening the said strap thereby transmitting the rotation of the driving shaft to the said driven shaft for operating the said brake-mechanism.

In testimony whereof I affix my signature.

ALFREDO EUTERPINO BORGES.